United States Patent
Ando

(10) Patent No.: US 8,256,546 B2
(45) Date of Patent: Sep. 4, 2012

(54) INTERNAL COMBUSTION ENGINE APPARATUS, CONTROL METHOD THEREOF, AND HYBRID VEHICLE

(75) Inventor: Ikuo Ando, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 392 days.

(21) Appl. No.: 12/646,003

(22) Filed: Dec. 23, 2009

(65) Prior Publication Data
US 2010/0162707 A1   Jul. 1, 2010

(30) Foreign Application Priority Data
Dec. 26, 2008 (JP) .................... 2008-334125

(51) Int. Cl.
*F02P 5/04* (2006.01)
(52) U.S. Cl. ............. 180/65.21; 180/309; 123/406.45; 701/108
(58) Field of Classification Search ........... 180/65.21, 180/309, 68.3; 701/99, 108; 123/406.11, 123/406.45, 406.44, 568.11, 568.14
See application file for complete search history.

(56) References Cited

U.S. PATENT DOCUMENTS

| | | | |
|---|---|---|---|
| 6,729,301 B2* | 5/2004 | Nakamori et al. | 123/406.48 |
| 7,444,220 B2 | 10/2008 | Yamazaki | |
| 8,004,218 B2* | 8/2011 | Soma et al. | 318/105 |

FOREIGN PATENT DOCUMENTS

| | | |
|---|---|---|
| JP | 9242654 A | 9/1997 |
| JP | 11201010 A | 7/1999 |
| JP | 2001263119 A | 9/2001 |
| JP | 2004011619 A | 1/2004 |
| JP | 2005320941 A | 11/2005 |

OTHER PUBLICATIONS

Mechanical translation of JP 09-242654, cited by Applicant.*

* cited by examiner

*Primary Examiner* — John Walters
(74) *Attorney, Agent, or Firm* — Gifford, Krass, Sprinkle, Anderson & Citkowski, P.C.

(57) ABSTRACT

An internal combustion engine apparatus provided with an internal combustion engine in which ignition timing can be adjusted and which has attached thereto an exhaust gas recirculation device that recirculates exhaust gas to an intake side, a control method for the internal combustion engine apparatus, and a hybrid vehicle are provided. When it is not a recirculation ratio variation time, a target ignition timing is set by correcting a base ignition timing that has been established as a base value of an ignition timing of the internal combustion engine by a first correction amount, and when it is the recirculation ratio variation time, the target ignition timing is set by correcting the base ignition timing by a second correction amount that delays an ignition timing more than a provisional correction amount obtained by correcting the first correction amount, and the internal combustion engine is controlled so that the internal combustion engine is operated due to the ignition at the target ignition timing that has been set.

8 Claims, 9 Drawing Sheets

INTERNAL COMBUSTION ENGINE APPARATUS, CONTROL METHOD THEREOF, AND HYBRID VEHICLE

INCORPORATION BY REFERENCE

The disclosure of Japanese Patent Application No. 2008-334125 filed on Dec. 26, 2008 including the specification, drawings and abstract is incorporated herein by reference in its entirety.

BACKGROUND OF THE INVENTION

1. Field of the Invention

The invention relates to an internal combustion engine apparatus, a control method thereof, and a hybrid vehicle.

2. Description of the Related Art

An internal combustion engine device of this kind has been suggested that is provided with an engine of a direct injection system having attached thereto a unit for returning Exhaust Gas Recirculation (EGR) from an exhaust passage into an intake passage, wherein a base ignition timing is set on the basis of a fuel injection amount and a revolution speed of the engine, an actual EGR ratio is estimated by an intake pipe pressure and an intake air quantity, an ignition advance correction is set based on the estimated actual EGR ratio, and the base ignition timing is corrected by the ignition advance correction that has been set (see, for example, Japanese Patent Application Publication No. 11-201010 (JP-A-11-201010)). In this apparatus, the base ignition timing is corrected by ignition advance correction based on the actual EGR ratio, thereby making it possible to prevent a misfire and degradation of fuel consumption and exhaust gas even when the EGR amount varies in a transition state.

In the above-described apparatus, a misfire and degradation of fuel consumption and exhaust gas can be prevented even when the EGR amount varies in a transition state by correcting the base ignition timing by ignition advance correction based on the actual EGR ratio. However, when the actual EGR ratio varies, the estimation accuracy of the actual EGR ratio easily drops. Therefore, where the ignition timing is corrected by using the actual EGR ratio as is, the ignition timing can be advanced more than necessary and knocking can occur in the engine. Furthermore, an internal combustion engine apparatus that has the hardware configuration identical to that of the above-described internal combustion engine apparatus and in which the ignition timing is corrected based on a target EGR ratio as a target value of the EGR ratio, rather than on the actual EGR ratio, is also available. In this case, when the target EGR ratio varies, a difference appears between the target EGR ratio and the actual EGR ratio. Therefore, the ignition timing is not properly corrected and engine knocking can occur.

SUMMARY OF THE INVENTION

With the foregoing in view, it is an object of the invention to provide an internal combustion engine apparatus that can prevent the occurrence of knocking in the internal combustion engine at the recirculation ratio variation time when the recirculation ratio varies, the recirculation ratio being a ratio of a recirculation amount to a sum of the recirculation amount of the exhaust gas to the intake performed by the exhaust recirculation device and an intake air quantity of the internal combustion engine, and a control method thereof, as well as a hybrid vehicle.

An internal combustion engine apparatus according to the first aspect of the invention is an internal combustion engine apparatus provided with an internal combustion engine in which an ignition timing can be adjusted and which has attached thereto an EGR device that recirculates exhaust gas to an intake side, including: a controller that is configured to set a target ignition timing by correcting a base ignition timing that has been established as a base value of an ignition timing of the internal combustion engine by a first correction amount obtained from a target recirculation ratio as a target value of a recirculation ratio when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine, the controller being configured to set the target ignition timing by correcting the base ignition timing by a second correction amount that delays an ignition timing more than a provisional correction amount obtained by correcting the first correction amount by a variation degree at which the recirculation ratio varies toward the target recirculation ratio when it is the recirculation ratio variation time, and to control the internal combustion engine so that the internal combustion engine is operated due to the ignition at the target ignition timing that has been set.

As described above, in the internal combustion engine apparatus according to the first aspect, when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine, a target ignition timing is set by correcting a base ignition timing that has been established as a base value of an ignition timing of the internal combustion engine by a first correction amount obtained from a target recirculation ratio as a target value of the recirculation ratio and the internal combustion engine is controlled so that the internal combustion engine is operated with the ignition at the target ignition timing that has been set. By contrast, when it is the recirculation ratio variation time, the target ignition timing is set by correcting the base ignition timing by a second correction amount that delays an ignition timing more than a provisional correction amount obtained by correcting the first correction amount by a variation degree at which the recirculation ratio varies toward the target recirculation ratio, and the internal combustion engine is controlled so that the internal combustion engine is operated with the ignition at the target ignition timing that has been set. As a result, the occurrence of knocking in the internal combustion engine at the recirculation ratio variation time can be inhibited. Further, it can be assumed that when the target recirculation ratio has a value of 0, the first correction amount has a value of 0.

In the internal combustion engine apparatus according to the first aspect of the invention, the controller can be configured to set the target ignition timing by correcting the base ignition timing by the second correction amount that advances the ignition timing slower than the provisional correction amount when the ignition timing is advanced following an increase in the recirculation ratio, and can be configured to set the target ignition timing by correcting the base ignition timing by the second correction amount that delays the ignition timing faster than the provisional correction amount when the ignition timing is delayed following a decrease in the recirculation ratio.

Further, in the internal combustion engine apparatus according to the first aspect of the invention, the controller can be configured to take, at the recirculation ratio variation time, a ratio of a variation amount of the recirculation ratio to a variation amount of the target recirculation ratio as the variation degree and set the provisional correction amount by a sum of a value obtained by multiplying a difference in the first correction amount before and after a variation in the target recirculation ratio by the variation degree and the first correction amount before the variation of the target recirculation ratio.

An internal combustion engine apparatus according to the second aspect of the invention is an internal combustion engine apparatus provided with an internal combustion engine in which an ignition timing can be adjusted and which has attached thereto an EGR device that recirculates exhaust gas to an intake side, including: a controller that is configured to set a target ignition timing by correcting a base ignition timing that has been established as a base value of an ignition timing of the internal combustion engine by a third correction amount obtained from a recirculation ratio when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine, the controller being configured to set the target ignition timing by correcting the base ignition timing by a fourth correction amount that delays the ignition timing more than the third correction amount when it is the recirculation ratio variation time, and to control the internal combustion engine so that the internal combustion engine is operated due to the ignition at the target ignition timing that has been set.

As described above, in the internal combustion engine apparatus according to the second aspect of the invention, when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine, a target ignition timing is set by correcting a base ignition timing that has been established as a base value of an ignition timing of the internal combustion engine by a third correction amount obtained from a recirculation ratio and the internal combustion engine is controlled so that the internal combustion engine is operated with the ignition at the target ignition timing that has been set. By contrast, when it is the recirculation ratio variation time, the target ignition timing is set by correcting the base ignition timing by a fourth correction amount that delays an ignition timing more than the third correction amount, and the internal combustion engine is controlled so that the internal combustion engine is operated with the ignition at the target ignition timing that has been set. As a result, the occurrence of knocking in the internal combustion engine at the recirculation ratio variation time can be inhibited.

In the internal combustion engine apparatus according to the second aspect of the invention, the controller can be configured to set the target ignition timing by correcting the base ignition timing by the fourth correction amount that advances the ignition timing slower than the third correction amount when the ignition timing is advanced following an increase in the recirculation ratio, and to set the target ignition timing by correcting the base ignition timing by the fourth correction amount that delays the ignition timing faster than the third correction amount when the ignition timing is delayed following a decrease in the recirculation ratio.

In the internal combustion engine apparatus according to the first or second aspect of the invention, the controller can be configured to reset the base ignition timing so that an ignition timing is delayed in comparison with the base ignition timing obtained from a revolution speed and the intake air quantity of the internal combustion engine at an air quantity variation time when the intake air quantity varies. As a result, the occurrence of knocking in the internal combustion engine at the air quantity variation time can be inhibited. In the internal combustion engine apparatus according to these aspects of the invention, the controller can be configured to reset the base ignition timing so that an ignition timing is advanced slower than the base ignition timing obtained from a revolution speed and the intake air quantity of the internal combustion engine when an ignition timing is advanced following a decrease in the intake air quantity, and to reset the base ignition timing so that an ignition timing is delayed faster than the base ignition timing obtained from a revolution speed and the intake air quantity of the internal combustion engine when an ignition timing is delayed following an increase in the intake air quantity.

A hybrid vehicle in accordance with the invention includes the internal combustion engine apparatus according to either of the above-described first and second aspects of the invention; a generator that can input and output power; a three-shaft power input-output device that is connected to a drive shaft coupled to a drive wheel, an output shaft of the internal combustion engine, and a rotation shaft of the generator, and inputs/outputs power to/from any one shaft on the basis of power inputted/outputted to the remaining two shafts from among these three shafts; an electric motor that can input/output power to/from the drive shaft; and a power accumulation device that can exchange power with the generator and the electric motor.

Because the internal combustion engine apparatus according to either of the above-described first and second aspects of the invention is carried by the hybrid vehicle in accordance with the invention, the effect produced by the internal combustion engine apparatus of the first or second aspect of the invention, for example, the possibility of inhibiting the occurrence of knocking in the internal combustion engine at the recirculation ratio variation time can be demonstrated.

A control method for the internal combustion engine apparatus according to the first aspect of the invention is a control method for the internal combustion engine apparatus provided with an internal combustion engine in which an ignition timing can be adjusted and which has attached thereto an EGR device that recirculates exhaust gas to an intake side, the method including: setting a target ignition timing by correcting a base ignition timing that has been established as a base value of an ignition timing of the internal combustion engine by a first correction amount obtained from a target recirculation ratio as a target value of a recirculation ratio when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine; setting the target ignition timing by correcting the base ignition timing by a second correction amount that delays an ignition timing more than a provisional correction amount obtained by correcting the first correction amount by a variation degree at which the recirculation ratio varies toward the target recirculation ratio when it is the recirculation ratio variation time; and controlling the internal combustion engine so that the internal combustion engine is operated due to the ignition at the target ignition timing that has been set.

With the control method for the internal combustion engine apparatus according to the first aspect of the invention, when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine, a target ignition timing is set by correcting a base ignition timing that has been established as a base value of an ignition timing of the internal combustion engine by a first correction amount obtained from a target recirculation ratio as a target value of the recirculation ratio, and the internal combustion engine is controlled so that the internal combustion engine is operated with the ignition at the target ignition timing that has been set. By contrast, when it is the recirculation ratio variation time, the target ignition timing is set by correcting the base ignition timing by a second correction amount that delays an ignition timing more than a provisional correction amount obtained by correcting the first correction amount by a variation degree at which the recirculation ratio varies toward the target recirculation ratio when it is the recirculation ratio variation time, and the internal combustion engine is controlled so that the internal combustion engine is operated with the ignition at the target ignition timing that has been set. As a result, the occurrence of knocking in the internal combustion engine at the recirculation ratio variation time can be inhibited. Further, it can be assumed that when the target recirculation ratio has a value of 0, the first correction amount has a value of 0.

A control method for the internal combustion engine apparatus according to the second aspect of the invention is a control method for the internal combustion engine apparatus provided with an internal combustion engine in which an ignition timing can be adjusted and which has attached thereto an EGR device that recirculates exhaust gas to an intake side, the method including: setting a target ignition timing by correcting a base ignition timing that has been established as a base value of an ignition timing of the internal combustion engine by a third correction amount obtained from a recirculation ratio when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine; setting the target ignition timing by correcting the base ignition timing by a fourth correction amount that delays the ignition timing more than the third correction amount when it is the recirculation ratio variation time; and controlling the internal combustion engine so that the internal combustion engine is operated due to the ignition at the target ignition timing that has been set.

With the control method for the internal combustion engine apparatus according to the second aspect of the invention, when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine, a target ignition timing is set by correcting a base ignition timing that has been established as a base value of an ignition timing of the internal combustion engine by a third correction amount obtained from a recirculation ratio, and the internal combustion engine is controlled so that the internal combustion engine is operated with the ignition at the target ignition timing that has been set. By contrast, when it is the recirculation ratio variation time, the target ignition timing is set by correcting the base ignition timing by a fourth correction amount that delays an ignition timing more than the third correction amount, and the internal combustion engine is controlled so that the internal combustion engine is operated with the ignition at the target ignition timing that has been set. As a result, the occurrence of knocking in the internal combustion engine at the recirculation ratio variation time can be inhibited.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Best modes for carrying out the invention will be described below based on embodiments.

Figure 1:
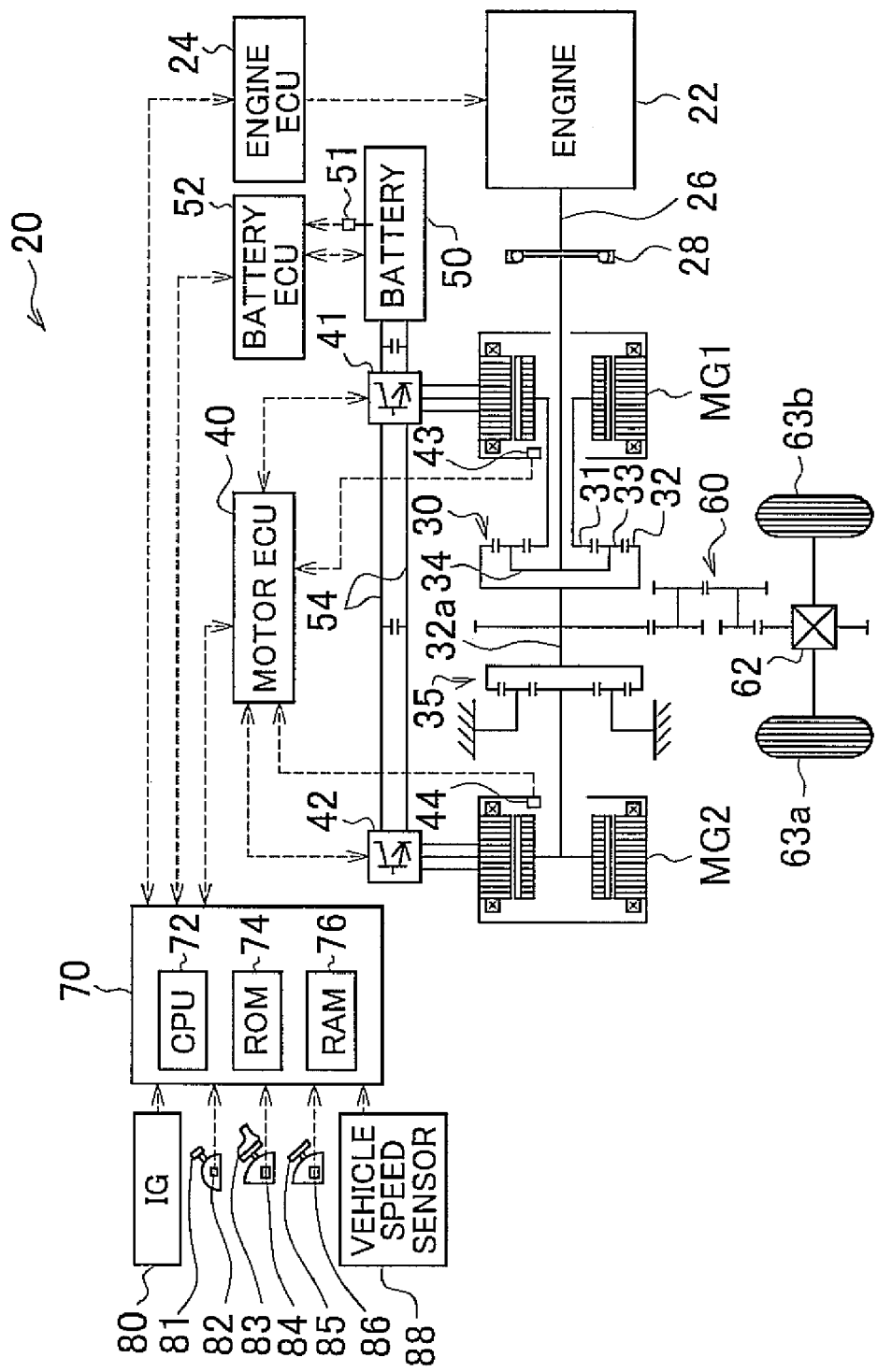
FIG. 1 is a configuration diagram illustrating schematically the configuration of the hybrid automobile that carries an internal combustion engine apparatus representing an embodiment of the invention.

FIG. 1 is a configuration diagram illustrating schematically the configuration of a hybrid automobile 20 that carries an internal combustion engine apparatus representing an embodiment of the invention. As shown in the figure, the hybrid automobile 20 of the present embodiment is provided with an engine 22, a three-shaft power distribution and integration mechanism 30 that is connected via a damper 28 to a crankshaft 26 serving as an output shaft of the engine 22, a motor MG1 that is connected to the power distribution and integration mechanism 30 and can generate electric power, a reduction gear 35 that is mounted on a ring gear shaft 32a serving as a drive shaft connected to the power distribution and integration mechanism 30, a motor MG2 connected to the reduction gear 35, and a hybrid electronic control unit 70 that controls the entire vehicle. In this case, the engine 22 and an ECU 24 that controls the engine 22 mainly correspond to the internal combustion engine apparatus of the present embodiment.

Figure 2:
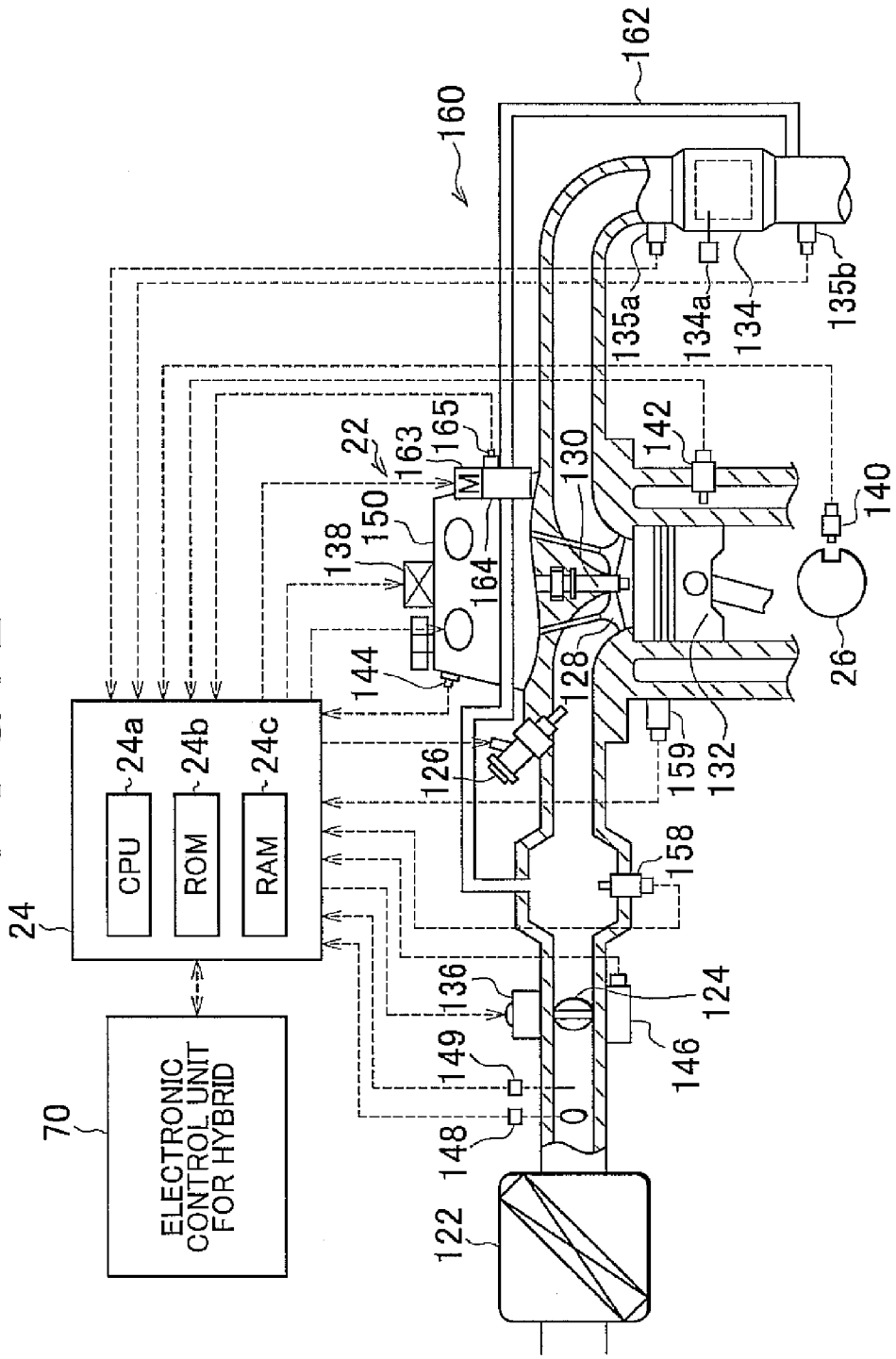
FIG. 2 is a configuration diagram illustrating schematically the configuration of an engine of the present embodiment.

The engine 22 is configured, for example, as an internal combustion engine apparatus in which power can be outputted by a hydrocarbon fuel such as gasoline and light oil. As shown in FIG. 2, the air cleaned by an air cleaner 122 is sucked in via a throttle valve 124, gasoline is injected from a fuel injection valve 126, the air and gasoline are mixed, the gaseous mixture is sucked into a combustion chamber via an intake valve 128 and exploded and combusted by an electric spark created by a spark plug 130, and the reciprocal movement of a piston 132 that is pushed down by the energy of combustion is converted into a rotational movement of the crankshaft 26. The exhaust gas from the engine 22 is discharged into the atmosphere via a purification device 134 that has a purification catalyst (three-way catalyst) that purifies harmful components such as carbon monoxide (CO), hydrogen carbide (HC), and nitrogen oxide ($NO_x$) and also supplied to the intake side via an EGR system 160. The EGR system 160 is provided with an EGR pipe 162 that is connected to a rear stage of the purification device 134 and serves to supply the exhaust gas to a surge tank on the intake side, and an EGR valve 164 that is disposed in the EGR pipe 162 and driven by a stepping motor 163. By regulating the opening degree of the EGR valve 164, the regulated amount of the exhaust gas as an unburned gas is supplied to the intake side. The engine 22 is thus configured to enable the suction of a gaseous mixture of air, exhaust gas, and gasoline into the combustion chamber. The supply of the exhaust gas of the engine 22 to the intake side will be referred to hereinbelow as EGR and the amount of exhaust gas supplied to the intake side will referred to as an EGR amount Ve.

The engine 22 is controlled by the ECU 24. The engine ECU 24 is configured as a microprocessor based on a central processing unit (CPU) 24a and is provided, in addition to the CPU 24a, with a read-only memory (ROM) 24b that stores a processing program, a random access memory (RAM) 24c that temporarily stores data, and an input/output port and a communication port (not shown in the figure). Signals from various sensors that detect the state of the engine 22, for example, a crank position from a crank position sensor 140 that detects the rotation position of the crankshaft 26, a cooling water temperature from a water temperature sensor 142 that detects the temperature of cooling water of the engine 22, a cam position from a cam position sensor 144 that detects a rotation position of the cam shaft that opens and closes the intake valve 128 and exhaust valve that perform intake into the combustion chamber and exhaust therefrom, a throttle opening degree Ta from a throttle valve position sensor 146 that detects the position of the throttle valve 124, an intake air quantity Qa from an air flow meter 148 mounted on the intake pipe, an intake air temperature from a temperature sensor 149 that is also mounted on the intake pipe, an intake air pressure Pin from an intake air pressure sensor 158 that detects the pressure inside the intake pipe, a catalyst temperature Tc from a catalyst temperature sensor 134a mounted on the purification device 134, an air/fuel ratio from an air/fuel ratio sensor 135a, an oxygen signal from an oxygen sensor 135b, a knock signal Ks from a knock sensor 159 that is mounted on a cylinder block and detects vibrations caused by occurrence of knocking, and an EGR valve opening degree EV from an EGR valve opening degree sensor 165 that detects the opening degree of the EGR valve 164 are inputted via the input port into the engine ECU 24. Further, various control signals for driving the engine 22, for example, a drive signal to the fuel injection valve 126, a drive signal to a throttle motor 136 that regulates the position of the throttle valve 124, a control signal to an ignition coil 138 that is integrated with an igniter, a control signal to a variable valve timing mechanism 150 that can change the opening-closing timing of the intake valve 128, and a drive signal to the stepping motor 163 that regulates the opening degree of the EGR valve 164 are outputted via the output port from the engine ECU 24. The engine ECU 24 communicates with the hybrid electronic control unit 70, controls the operation of the engine 22 by a control signal from the hybrid electronic control unit 70, and if necessary outputs data relating to the operation state of the engine 22. The engine ECU 24 calculates a revolution speed of the crankshaft 26, that is, the revolution speed Ne of the engine 22, on the basis of crank position from the crank position sensor 140, calculates a volume efficiency (the ratio of air volume that is actually sucked in one cycle to a stroke volume per one cycle of the engine 22) KL on the basis of the intake air quantity Qa from the air flow meter 148 and the revolution speed Ne of the engine 22, calculates an EGR ratio Re that is a ratio of the EGR amount Ve to a sum of the EGR amount Ve and the intake air quantity Qa of the engine 22 on the basis of the intake air quantity Qa from the air flow meter 148, an EGR valve opening degree EV from the EGR valve opening degree sensor 165, and the revolution speed Ne of the engine 22, and calculates a knock intensity Kr that indicates the generation level of knocking on the basis of an amplitude or waveform of the knock signal Ks from the knock sensor 159

The power distribution and integration mechanism 30 is configured as a planetary gear mechanism provided with a sun gear 31 as an external gear, a ring gear 32 as an internal gear that is disposed concentrically with the sun gear 31, a plurality of pinions 33 that mesh with the sun gear 31 and also mesh with the ring gear 32, and a carrier 34 that holds the plurality of pinions 33 so that they are free to rotate and revolve. The planetary gear mechanism performs a differential action using the sun gear 31, ring gear 32, and carrier 34 as rotation elements. In the power distribution and integration mechanism 30, the crankshaft 26 of the engine 22 is coupled to the carrier 34, the motor MG1 is coupled to the sun gear 31, and the reduction gear 35 is coupled to the ring gear 32 via a ring gear shaft 32a. When the motor MG1 functions as a power generator, the power from the engine 22 that is inputted from the carrier 34 is distributed to the sun gear 31 side and ring gear 32 side correspondingly to the gear ratio thereof, and when the motor MG1 functions as a power generator, the power from the engine 22 that is inputted from the carrier 34 and the power from the motor MG1 that is inputted from the sun gear 31 are integrated and outputted to the ring gear 32 side. The power outputted to the ring gear 32 is eventually outputted from the ring gear shaft 32a to drive wheels 63a, 63b of the vehicle via a gear mechanism 60 and a differential gear 62.

The motor MG1 and motor MG2 are configured as the conventional synchronous motor generators that can operate as power generators and also can operate as electric motors, and the exchange of electric power with a battery 50 is conducted via inverters 41 and 42. A power line 54 connecting the inverters 41, 42 and the battery 50 is configured as a positive electrode bus and a negative electrode bus that are shared by the inverters 41 and 42. The power generated by any one of the motors MG1 and MG2 can be consumed by the other motor. Therefore, the battery 50 is charged by electric power generated by any of the motors MG1 and MG2 and discharged where the power is insufficient. Where the power balance is attained with the motors MG1 and MG2, the battery 50 is neither charged nor discharged. The motors MG1 and MG2 are both operation controlled by a motor ECU 40. Signals necessary for operation controlling the motors MG1 and MG2, for example, signals from revolution position detection sensors 43 and 44 that detect the rotation positions of rotors of the motors MG1 and MG2 and phase currents that are supplied to the motor MG1 and MG2 and detected by a current sensor (not shown in the figure) are inputted to the motor ECU 40. Switching control signals are outputted from the motor ECU 40 to the inverters 41 and 42. The motor ECU 40 communicates with the hybrid electronic control unit 70, the motors MG1 and MG2 are operation controlled by the control signals from the hybrid electronic control unit 70, and data relating to the operation state of the motors MG1 and MG2 are outputted, if necessary, to the hybrid electronic control unit 70. The motor ECU 40 also calculates the revolution speed Nm1 and Nm2 of the motors MG1 and MG2 on the basis of signals from revolution position detection sensors 43 and 44.

The battery 50 is managed by a battery electronic control unit (referred to hereinbelow as battery ECU) 52. Signals necessary to manage the battery 50, for example, a terminal voltage from a voltage sensor (not shown in the figure) disposed between the terminals of the battery 50, a charge-discharge current from a current sensor (not shown in the figure) attached to the power line 54 connected to the output terminals of the battery 50, and a battery temperature Tb from a temperature sensor 51 mounted on the battery 50 are inputted to the battery ECU 52 and data relating to the state of the battery 50 are outputted, if necessary, by communication to the hybrid electronic control unit 70. The battery ECU 52 calculates a residual capacity (state of charge (SOC)) on the basis of the integral value of a charge-discharge electric current detected by the current sensor to manage the battery 50 and calculates input and output limits Win, Wout that are the maximum allowed power at which the battery 50 may be charged and discharged on the basis of the calculated residual capacity (SOC) and battery temperature Tb. The input and output limits Win, Wout of the battery 50 can be set by setting basic values of the input and output limits Win, Wout on the basis of battery temperature Tb, setting a correction coefficient for an output limit and a correction coefficient for an input limit on the basis of the residual capacity (SOC) of the battery 50, and multiplying the basic values of the input and output limits Win, Wout that have been set by the correction coefficients.

The hybrid electronic control unit 70 is configured as a microprocessor centered on a CPU 72 and is provided, in addition to the CPU 72, with a ROM 74 that stores a processing program, a RAM 76 that stores data temporarily, and input/output ports and a communication port (not shown in the figure). An ignition signal from an ignition switch 80, a shift position SP from a shift position sensor 82 that detects the operation position of a shift lever 81, an accelerator depression amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88 are inputted via an input port to the hybrid electronic control unit 70. As mentioned hereinabove, the hybrid electronic control unit 70 is connected to the engine ECU 24, motor ECU 40, and battery ECU 52 via communication ports and exchanges control signals and data with the engine ECU 24, motor ECU 40, and battery ECU 52.

In the hybrid automobile 20 of the embodiment having the above-described configuration, a required torque that has to be outputted to the ring gear shaft 32a serving as a drive shaft is calculated on the basis of the vehicle speed V and accelerator depression amount Acc corresponding to the amount to which the driver depresses the accelerator pedal 83, and the engine 22, motor MG1, and motor MG2 are operation controlled so that the required power corresponding to the required torque is outputted to the ring gear shaft 32a. The operation control of the engine 22, motor MG1, and motor MG2 can be conducted in a torque conversion operation mode, charge-discharge operation mode, and motor operation mode. In the torque conversion operation mode, the engine 22 is operation controlled so that power matching the required power is outputted from the engine 22 and the motor MG1 and motor MG2 are drive controlled so that the entire power outputted from the engine 22 is torque converted by the power distribution and integration mechanism 30, motor MG1, and motor MG2 and outputted to the ring gear shaft 32a. In the charge-discharge operation mode, the engine 22 is operation controlled so that power matching a sum total of the required power and power necessary to charge-discharge the battery 50 is outputted from the engine 22, and the motor MG1 and motor MG2 are drive controlled so that the entire power outputted from the engine 22 following the charge-discharge of the battery 50 or part of this power is torque converted by the power distribution and integration mechanism 30, motor MG1, and motor MG2 and the required power is outputted to the ring gear shaft 32a. In the motor operation mode, operation control is conducted so as to stop the operation of the engine 22 and output power matching the required power from the motor MG2 to the ring gear shaft 32a. Both the torque conversion operation mode and charge-discharge operation mode are modes in which the engine 22 and motors MG1 and MG2 are controlled so that the required power is outputted to the ring gear shaft 32a, following the operation of the engine 22, and are not essentially different in the control performed. For this reason these two modes will be together referred to hereinbelow as an engine operation mode.

In the engine operation mode, the hybrid electronic control unit 70 sets a required torque Tr* that has to be outputted to the ring gear shaft 32a serving as a drive shaft on the basis of the accelerator depression amount Acc from the accelerator pedal position sensor 84 and the vehicle speed V from the vehicle speed sensor 88, calculates travel power Pr* that is required for traveling by multiplying the required torque Tr* that has been set by a revolution speed Nr of the ring gear shaft 32a (for example, a revolution speed obtained by deleting the revolution speed Nm2 of the motor MG2 by a gear ratio of the reduction gear 35 or a revolution speed obtained by multiplying the vehicle speed V by a conversion coefficient), sets required power Pe* as power that has to be outputted from the engine 22 by subtracting charge-discharge required power Pb* (a positive value when the battery 50 is discharged) of the battery 50 obtained based on the residual capacity (SOC) of the battery 50 from the calculated travel power Pr*, sets a target torque Te* and a target revolution speed Ne* of the engine 22 by using an operation line (for example, an operation line with optimum fuel consumption) serving as a relationship between a torque Te and revolution speed Ne of the engine 22 that makes it possible to output the required power Pe* from the engine 22 with good efficiency, sets a torque command Tm1* as a torque that has to be outputted from the motor MG1 by revolution speed feedback control ensuring that the revolution speed Ne of the engine 22 becomes the target revolution speed Ne* in the ranges of input and output limits Win and Wout of the battery 50, sets a torque command Tm2* of the motor MG2 by subtracting from the required torque Tr* a torque that acts upon the ring gear shaft 32a via the power distribution and integration mechanism 30 when the motor MG1 is driven by the torque command Tm1*, sends the target revolution speed Ne* and target torque Te* to the engine ECU 24, and sends the torque commands Tm1* and Tm2* to the motor ECU 40. The engine ECU 24 that has received the target revolution speed Ne* and target torque Te* sets a target EGR ratio Re as a target value of the EGR ratio Re on the basis of the target revolution speed Ne* and target torque Te*, conducts the intake air quantity control, fuel injection control, and ignition control of the engine 22 such that the engine 22 is operated by the target revolution speed Ne* and target torque Te*, and adjusts the opening degree of the EGR valve 164 of the EGR system 160 so that the EGR ratio Re becomes the target EGR ratio Re*. Further, the motor ECU 40 that has received the torque commands Tm1* and Tm2* conducts switching control of switching elements of the inverters 41 and 42 such that the motors MG1 and MG2 are driven by the torque commands Tm1* and Tm2*.

In the motor operation mode, the hybrid electronic control unit 70 sets a value 0 to the torque command Tm1* of the motor MG1, sets the torque command Tm2* of the motor MG2 such that the required torque Tr* is outputted to the ring gear shaft 32a serving as a drive shaft in the ranges of the input-output limits Win and Wout of the battery 50, and sends the torque commands to the motor ECU 40. The motor ECU 40 that has received the torque commands Tm1* and Tm2* performs switching control of switching elements of the inverters 41 and 42 such that the motors MG1 and MG2 are driven by the torque commands Tm1* and Tm2*.

Figure 3:
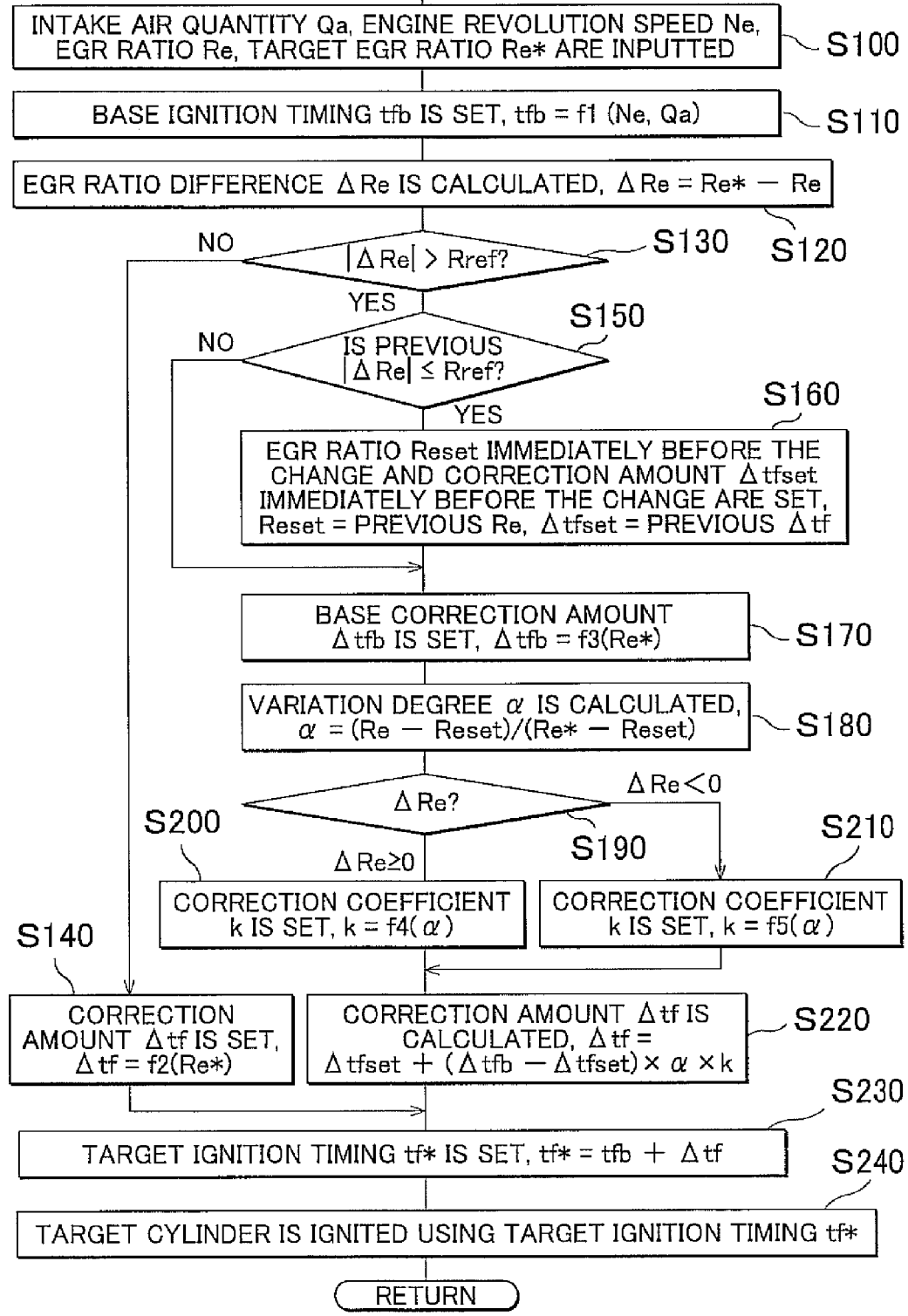
FIG. 3 is a flowchart illustrating an example of an ignition control routine executed by an engine electronic control unit (ECU) in the present embodiment.
Figure 4:
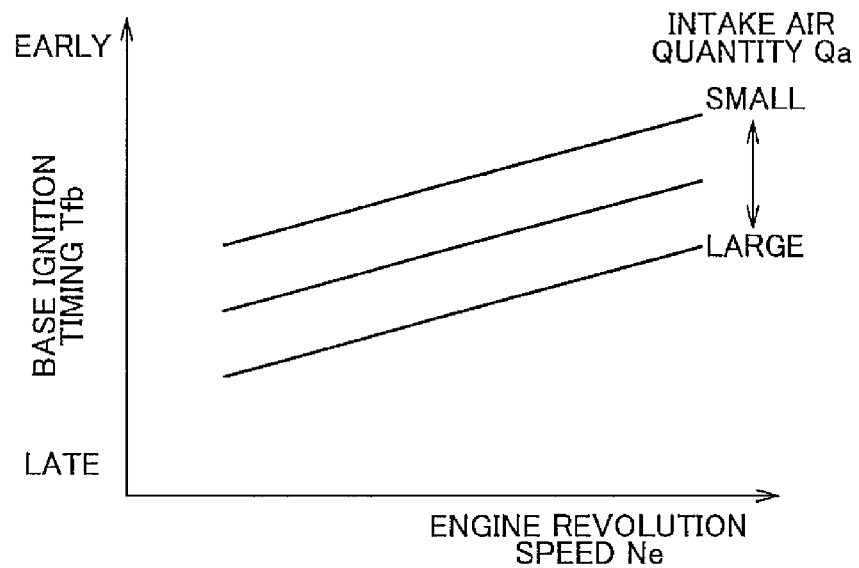
FIG. 4 is an explanatory drawing illustrating an example of a map for setting a base ignition timing in the present embodiment.

The operation of the hybrid automobile 20 of the embodiment having the above-described configuration, more particularly the ignition control of the engine 22 in the case the automobile travels in the engine operation mode will be described below. FIG. 3 is a flowchart illustrating an example of an ignition control routine executed by the engine ECU 24. This routine is executed repeatedly for each predetermined time (for example, every several milliseconds).

Where the ignition control routine shown in FIG. 3 is executed, the CPU 24a of the engine ECU 24 initially executes a processing of inputting data that are necessary for the control, such as the intake air quantity Qa from the air flow meter 148, revolution speed Ne of the engine 22, EGR ratio Re, and target EGR ratio Re* (step S100). In this case, the revolution speed Ne of the engine 22 is inputted by reading a value calculated based on a signal from the crank position sensor 140 and written to a predetermined address of the RAM 24c. The EGR ratio Re is inputted by reading a value obtained by calculating based on the intake air quantity Qa from the air flow meter 148, EGR value opening degree EV from the EGR valve opening degree sensor 165, and revolution speed Ne from the engine 22 and writing to the predetermined address of the RAM 24c. Further, the target EGR ratio Re* is inputted by reading a value obtained by setting based on the target revolution speed Ne* and target torque Te* and writing to the predetermined address of the RAM 24c. In parallel with the ignition control routine, the engine ECU 24 conducts the intake air quantity control or fuel ignition control and also drive controls the stepping motor 163 and adjusts the EGR valve opening degree EV so that the EGR ratio Re becomes the target EGR ratio Re*. When the target EGR ratio Re* is zero, the EGR valve 164 is closed. In the explanation below, for the sake of convenience, values relating to an ignition timing (base ignition timing tfb, base correction amount Δtfb, correction amount Δtf, target ignition timing tf*, and the like) are assumed to increase as the ignition timing advances.

Where data are thus inputted, the base ignition timing tfb serving as a base value of the target ignition timing tf* is set on the basis of the inputted revolution speed Ne of the engine 22 and intake air quantity Qa (step S110). As for the base ignition timing tfb, in the present embodiment, the relationship between the revolution speed Ne of the engine 22, intake air quantity Qa, and base ignition timing tfb is established in advance and stored as a map for setting the base ignition timing in the ROM 24b, and where the revolution speed Ne of the engine 22 and intake air quantity Qa are given, the corresponding base ignition timing tfb is derived and set from the stored map. An example of the map for setting the base ignition timing is shown in FIG. 4. As shown in the figure, the base ignition timing tfb is set to decrease with the increase in the revolution speed Ne of the engine 22 and increase with the increase in the intake air quantity Qa. This is because where the revolution speed Ne of the engine 22 is large, the effect of time lag before the explosive combustion actually occurs after an electric spark jumps from the spark plug 30 increases, and where the intake air quantity Qa is large, knocking in the engine 22 can easily occur.

An EGR ratio difference ΔRe is then calculated by subtracting the EGR ratio Re from the target EGR ratio Re* (step S120) and the absolute value of the calculated EGR ratio difference ΔRe is compared with a threshold Rref (step S130). Here, the threshold Rref is used to determine whether this is an EGR ratio variation time in which the EGR ratio Re varies and is set with consideration for the calculation accuracy of the EGR ratio Re.

Figure 5:
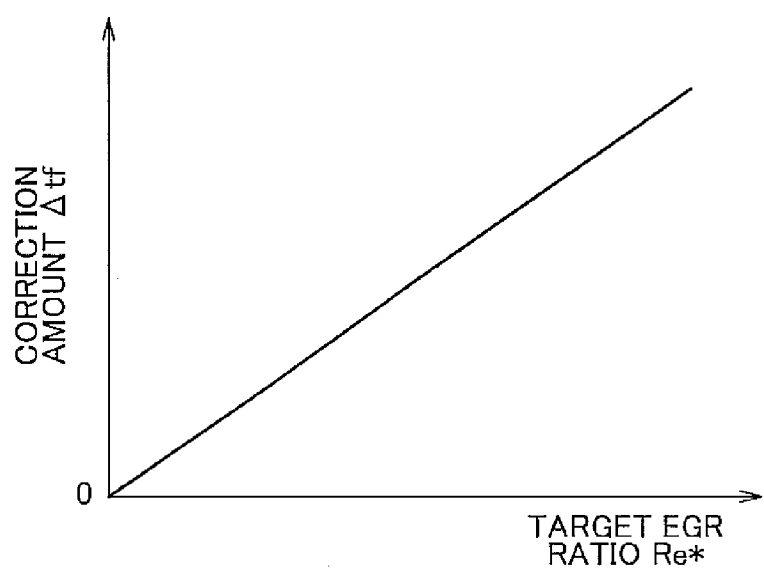
FIG. 5 is an explanatory drawing illustrating an example of a map for setting a correction amount in the present embodiment.

When the absolute value of the EGR ratio difference ΔRe is equal to or less than the threshold Rref, it is determined that the EGR ratio does not change, the correction amount Δtf for decreasing or increasing the ignition timing of the engine 22 is set on the basis of the target EGR ratio Re* (step S140), the correction amount Δtf that has been set is added to the base ignition timing tfb to set the target ignition timing tf* (step S230), the ignition coil 138 is drive controlled so that the ignition in the object cylinder is performed at the target ignition timing tf* that has been set (step S240), and the routine is ended. As for the correction amount Δtf, in the present embodiment, the relationship between the EGR ratio Re and the correction amount Δtf is found in advance by an experiment or the like and stored as a map for correction amount setting in the ROM 24b, and where the EGR ratio Re is given, the corresponding correction amount Δtf is derived and set from the stored map. An example of the map for correction amount setting is shown in FIG. 5. As shown in the figure, the correction amount Δtf is set to assume a larger value in the direction of delaying the ignition timing as the target EGR ratio Re* increases. This is because when the target EGR ratio Re* (EGR ratio Re) is large, knocking hardly occurs in the engine 22.

When in step S130 the absolute value of the EGR ratio difference ΔRe is larger than the threshold Rref, the absolute value of the EGR ratio difference (previous ΔRe) obtained when the routine was executed in the previous cycle is compared with the threshold Rref (step S150). This processing is conducted to determine whether the EGR ratio Re started changing following variations in the target EGR ratio Re* from a state in which the EGR ratio Re is almost constant in the vicinity of the target EGR ratio Re*. When the absolute value of the previous EGR ratio difference (previous ΔRe) is equal to or less than the threshold Rref, it is determined that the EGR ratio Re starts changing, the previous EGR ratio (previous Re) is set to an EGR ratio Reset immediately before the change, which is the EGR ratio Re immediately before the EGR ratio Re starts changing, and the previous correction amount (previous Δtf) is set to a correction amount Δtfset immediately before the change, which is the correction amount immediately before the EGR ratio Re starts changing (step S160). Further, because it is assumed that the EGR ratio Re starts changing from a state in which the EGR ratio Re is almost constant in the vicinity of the target EGR ratio Re*, the EGR ratio Reset immediately before the change also corresponds to the target EGR ratio Re* immediately before the EGR ratio Re starts changing. When this routine is executed in the next and subsequent cycles, because the previous EGR ratio difference (previous ΔRe) is larger than the threshold Rref, the setting of the EGR ratio Reset immediately before the change and correction amount Δtfset immediately before the change is not conducted.

Then, the base correction amount Δtfb serving as a base value of the correction amount Δtf is set on the basis of the target EGR ratio Re* (step S170) and a variation degree α is calculated that indicates the degree to which the EGR ratio Re has changed from the EGR ratio Reset immediately before the change toward the target EGR ratio Re* (step S180). The calculation is performed by the following Equation (1) on the basis of the EGR ratio Re, target EGR ratio Re*, and EGR ratio Reset immediately before the change. In this case, the base correction amount Δtfb is set by using a graph in which the "Correction Amount Δtf" plotted against the ordinate in FIG. 5 is replaced with "Base Correction Amount Δtfb". Further the variation degree α assumes a value of 0 when the EGR ratio Re is equal to the EGR ratio Reset immediately before the change, approaches a value of 1 from a value of 0 as the EGR ratio Re changes, and assumes a value of 1 when the EGR ratio Re become equal to the target EGR ratio Re*.

$$\alpha=(Re-\text{Reset})/(Re^*-\text{Reset}) \quad (1)$$

Figure 6:
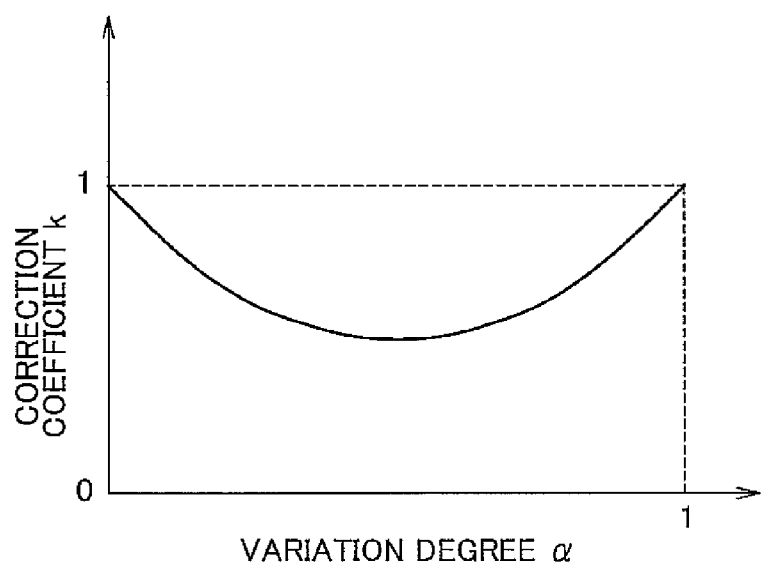
FIG. 6 is an explanatory drawing illustrating an example of a map for setting a correction coefficient when the EGR ratio increases in the present embodiment.
Figure 7:
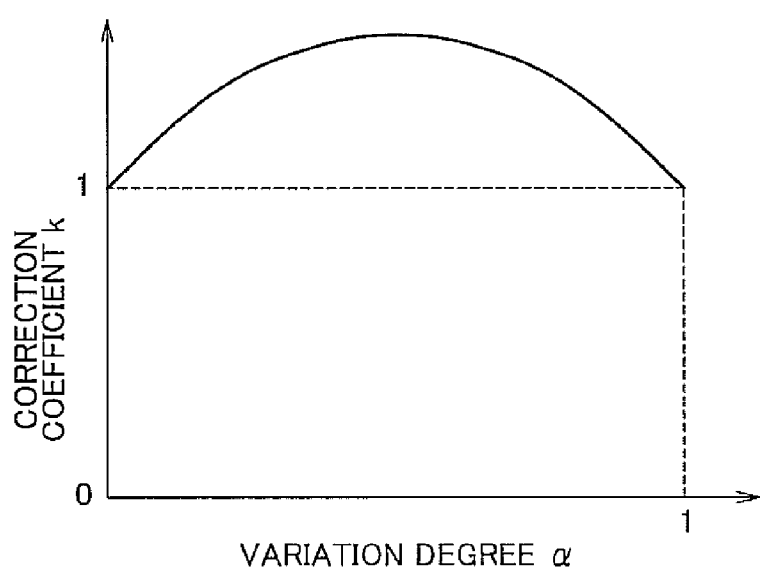
FIG. 7 is an explanatory drawing illustrating an example of a map for setting a correction coefficient when the EGR ratio decreases in the present embodiment.

A value of the EGR ratio difference ΔRe is then examined (step S190). When the EGR ratio difference ΔRe is equal to or larger than a value of 0, an EGR ratio increase time is determined in which the EGR ratio Re increases, and a correction coefficient k is set on the basis of the variation degree α (step S200). When the EGR ratio Re is less than a value of 0, an EGR ratio decrease time is determined in which the EGR ratio Re decreases, and a correction coefficient k is set on the basis of the variation degree α (step S210). The correction amount Δtf is then calculated by the following Equation (2) on the basis of the correction amount Δtfset immediately before the change, base correction amount Δtfb, variation degree α, and correction coefficient k (step S220), the target ignition timing tf* is set by adding the calculated correction amount Δtf to the base ignition timing tfb (step S230), the ignition coil 138 is drive controlled so that the ignition in the object cylinder is performed at the target ignition period tf* that has been set (step S240), and the routine is ended. As for the correction coefficient k at the EGR ratio increase time or EGR ratio decrease time, in the present embodiment, a relationship between the variation degree α and correction coefficient k is established in advance and stored as a map for setting a correction coefficient when the EGR ratio increases or a map for setting a correction coefficient when the EGR ratio decreases, and where the variation degree α is given, the corresponding correction coefficient k is derived and set from the respective map. An example of the map for setting a correction coefficient at the EGR ratio increase time is shown in FIG. 6, and an example of the map for setting a correction coefficient at the EGR ratio decrease time is shown in FIG. 7. As shown in FIG. 6, as the variation degree α changes from a value of 0 to a value of 1, the correction coefficient k at the EGR ratio increase time decreases from a value of 1 and then increases toward a value of 1 within a range from a value of 0 to a value of 1. Further, as shown in FIG. 7, as the variation degree α changes from a value of 0 to a value of 1, the correction coefficient k at the EGR ratio decrease time increases from a value of 1 and then decreases toward a value of 1 within a range of equal to and greater than a value of 1. Where the correction coefficient k is thus set, either at the EGR ratio increase time or at the EGR ratio decrease time, the correction amount Δtf assumes a value that is less than that obtained by calculations without using the correction coefficient k (the value of the correction coefficient k is taken as 1) (the correction amount Δtf in which case will be referred to hereinbelow as a correction amount Δtfex of comparative example; see Equation (3) below). Therefore, the target ignition timing tf* that is set by using the correction amount Δtf of the present embodiment is later than the target ignition timing tf* that is set by using the correction amount Δtfex of comparative example. Thus, in a case where the target ignition timing tf* is set by using the correction amount Δtf of the present embodiment, when the ignition timing is advanced following the increase in the EGR ratio Re, the ignition timing is advanced slower than in a case in which the target ignition timing tf* is set by using the correction amount Δtfex of the comparative example, and when the ignition timing is delayed following the decrease in the EGR ratio Re, the ignition timing is delayed faster than in a case in which the target ignition timing tf* is set by using the correction amount Δtfex of the comparative example. At the EGR ratio increase time or EGR ratio decrease time, the EGR ratio Re is sometimes difficult to estimate correctly by the variation of the EGR valve opening degree EV (correct estimation of the variation ratio cc is difficult), but by setting the target ignition timing tf* and conducting ignition control as described above, it is possible to inhibit the occurrence of knocking in the engine 22.

$$\Delta tf=\Delta tf\text{set}+(\Delta tfb-\Delta tf\text{set})\times\alpha\times k \quad (2)$$

$$\Delta tfex=\Delta tf\text{set}+(\Delta tfb-\Delta tf\text{set})\times\alpha \quad (3)$$

Figure 8:
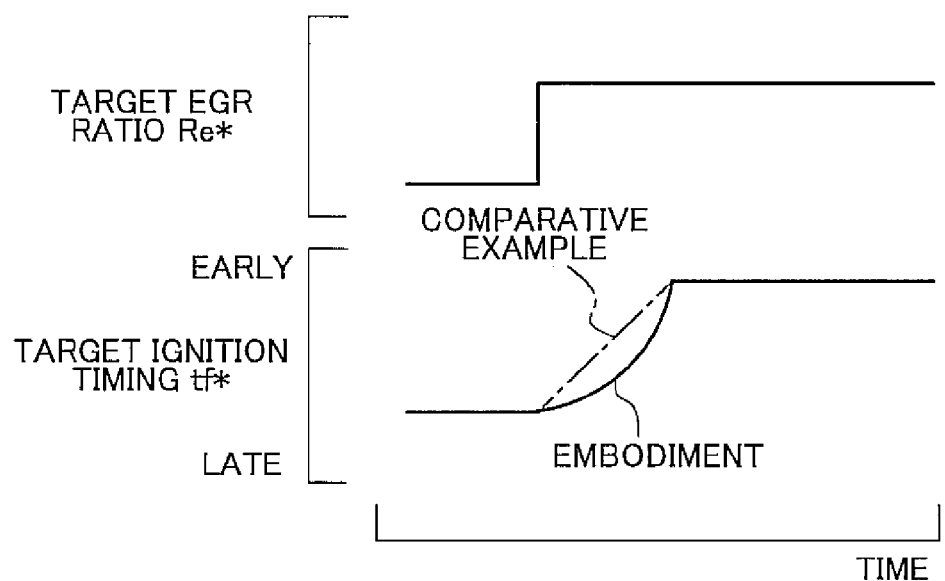
FIG. 8 is a schematic diagram illustrating schematically how a target EGR ratio and a target ignition timing vary with time when the ignition timing of the engine is advanced following the increase in the target EGR ratio in the present embodiment.

FIG. 8 is a schematic diagram that shows schematically how the target EGR ratio Re* and target ignition timing tf* change with time when the ignition timing of the engine 22 is advanced following the increase in the target RGR ratio Re*. In the figure, a solid line shows changes with time in the present embodiment in which the target ignition timing tf* is set by using the correction amount Δtf obtained by the aforementioned Equation (2), and a dash-dot line shows changes with time in the comparative example in which the target ignition timing tf* is set by using the correction amount Δtfex obtained by the aforementioned Equation (3). As shown in the figure, when the target EGR ratio Re* increases, the target ignition timing tf* of the present embodiment advances slower than the target ignition timing tf* of the comparative example. Therefore, the occurrence of knocking in the engine 22 can be inhibited more effectively than in the comparative example.

With the hybrid automobile 20 of the above-described embodiment, when the base ignition timing tfb is set on the basis of the revolution speed Ne and intake air quantity Qa of the engine 22 and the EGR ratio Re increases or decreases, the target ignition timing tf* is set by correcting the base ignition timing tfb with the correction amount Δtf that delays the ignition timing more than the correction amount (correction amount Δtfrex) obtained by correcting the base correction amount Δtfb obtained from the target EGR ratio Re* with the variation degree α and the engine 22 is operated with the ignition at the target ignition timing tf*. Therefore, when the EGR ratio Re increases or decreases, the occurrence of knocking in the engine 22 can be inhibited.

In the hybrid automobile 20 of the present embodiment, the base ignition timing tfb is set by using the revolution speed Ne and intake air quantity Qa of the engine 22, but the base ignition timing tfb may be also set by using a volume efficiency KL instead of the intake air quantity Qa. In this case, the base ignition timing tfb may be set to advance with the increase in the revolution speed Ne of the engine 22 and delay with the increase in the volume efficiency KL. This is because where the revolution speed Ne of the engine 22 is large, the effect of time lag before the explosive combustion actually occurs after an electric spark jumps from the spark plug 30 increases, and where the volume efficiency KL is large, knocking in the engine 22 can easily occur.

Figure 9:
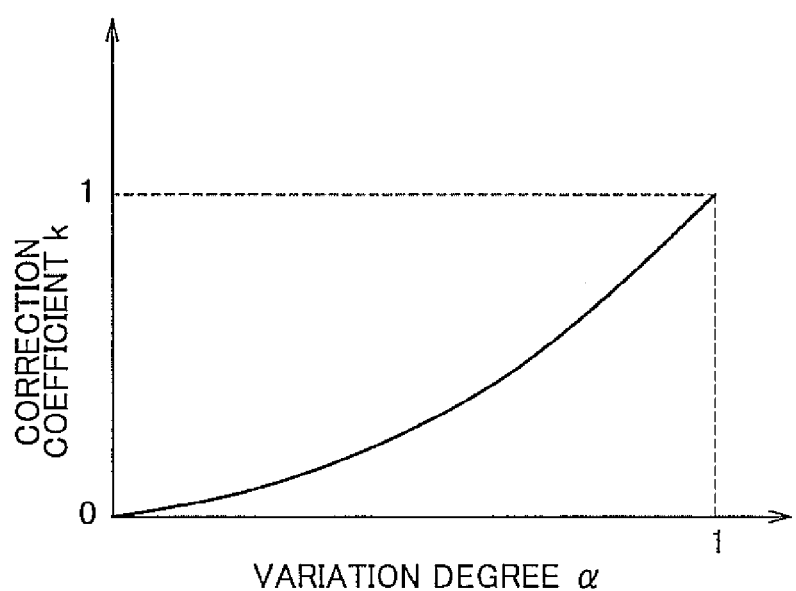
FIG. 9 is an explanatory drawing illustrating an example of a map for setting a correction coefficient by which the correction coefficient is set to another value in the present embodiment.

In the hybrid automobile 20 of the present embodiment, when the EGR ratio Re increases, the correction coefficient k is set by using a map for setting the correction coefficient when the EGR ratio increases that is shown in FIG. 6 on the basis of the variation degree α, and when the EGR ratio Re decreases, the correction coefficient k is set by using a map for setting the correction coefficient when the EGR ratio decreases that is shown in FIG. 7 on the basis of the variation degree α. However, any setting method may be used, provided that the correction coefficient k is set so that the correction amount Δtf becomes less than the correction amount Δtfex of the comparative example. For example, the correction coefficient k may be set by using a map for setting a correction coefficient that is shown by way of example in FIG. 9 and is such that the correction coefficient k changes from a value of 0 to a value of 1, following the change of the variation degree α from a value of 0 to a value of 1, when the EGR ratio Re increases.

In the hybrid automobile 20 of the present embodiment, when the EGR ratio Re varies, the correction amount Δtf is calculated by Equation (2) above on the basis of the correction amount Δtfset immediately before the change, base correction amount Δtfb, variation degree α, and correction coefficient k, but any method may be used, provided that the correction amount Δtf is set so that the ignition timing is delayed more than with the correction amount Δtfex of the comparative example calculated by Equation (3) above. For example, the correction amount Δtf may be set by subtracting a predetermined amount from the correction amount Δtfex of the comparative example.

Figure 10:
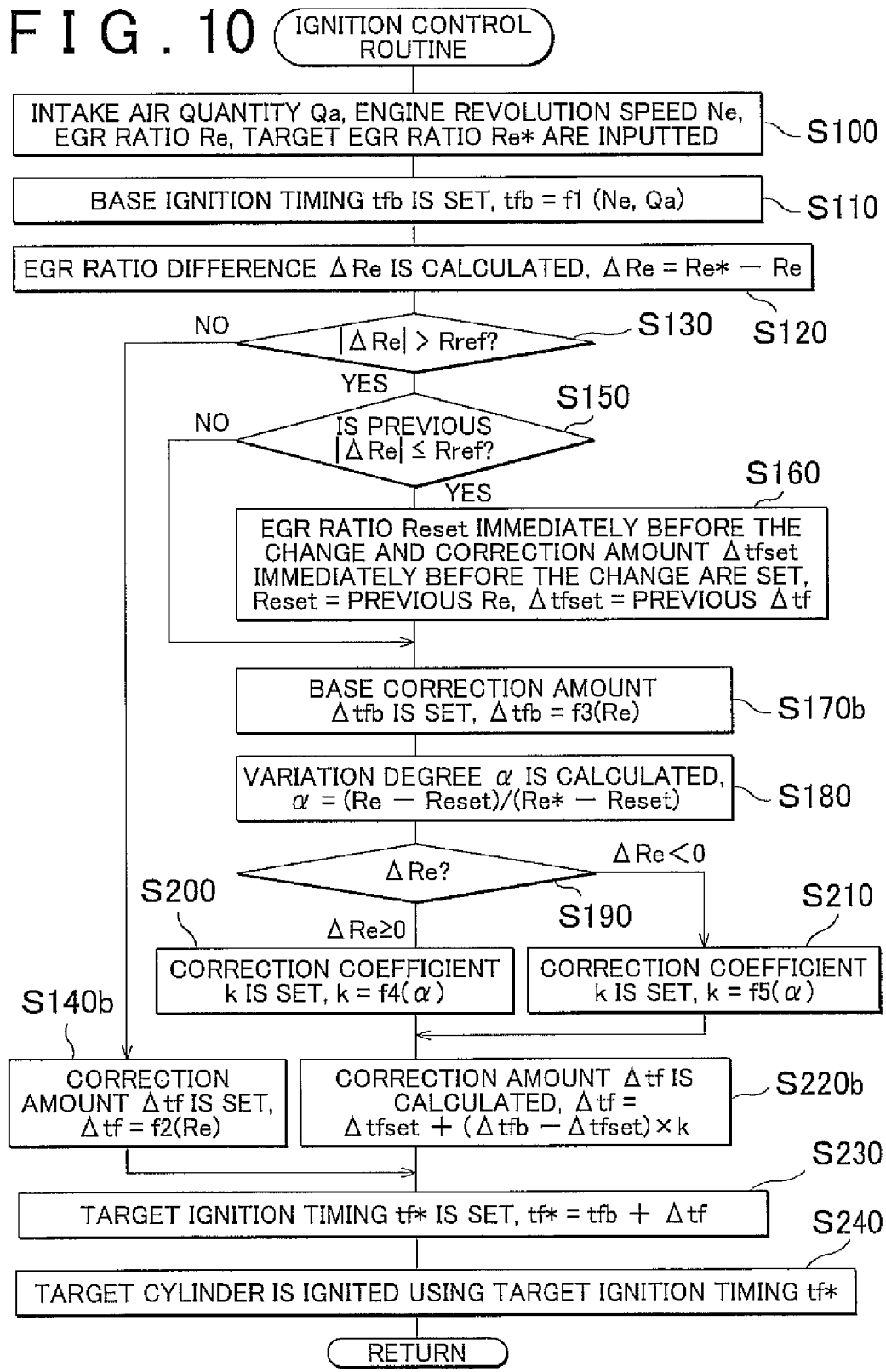
FIG. 10 is a flowchart illustrating an example of an ignition control routine of the first variation example of the present embodiment.

In the hybrid automobile 20 of the present embodiment, when the EGR ratio Re does not change, the correction amount Δtf is set on the basis of the target EGR ratio Re*, and when the EGR ratio Re changes, the base correction amount Δtfb is set on the basis of the target EGR ratio Re*, but it is also possible to set the correction amount Δtf on the basis of the EGR ratio Re when the EGR ratio Re does not change and set the base correction amount Δtfb on the basis of the EGR ratio Re when the EGR ratio Re changes. This will be explained below as a first variation example of the present embodiment. In the case of the first variation example, when the absolute value of the EGR ratio difference ΔRe is equal to or less than the threshold Rref (step S130), as shown by way of example by the ignition control routine in FIG. 10, the ignition control is conducted by setting the correction amount Δtf by replacing the "Target EGR Ratio Re*" plotted against the abscissa in the map for setting the correction amount that is shown in FIG. 5 with the "EGR Ratio Re" on the basis of the EGR ratio Re (step S140b) and using the target ignition timing tf* that is set by correcting the base ignition timing tftmp with the correction amount Δtf that has been set (steps S230, S240). When the absolute value of the EGR ratio difference ΔRe is greater than the threshold Rref, the ignition control may be conducted by setting the base correction amount Δtfb by replacing the "Target EGR Ratio Re*" plotted against the abscissa in the map for setting the correction amount that is shown in FIG. 5 with the "EGR Ratio Re" on the basis of the EGR ratio Re and replacing the "Correction Amount Δtf" that is plotted against the ordinate with the "Base Correction Amount Δtfb" (step S170b), setting the correction coefficient k on the basis of the EGR ratio difference ΔRe and the variation degree α (steps S180 to S210), calculating the correction amount Δtf by Equation (4) below on the basis of the correction amount Δtfset immediately before the change, base correction amount Δtfb, and correction coefficient k (step S220b), and using the target ignition timing tf* that is set by correcting the base ignition timing tftmp with the calculated correction amount Δtf (steps S230, S240). The effect demonstrated in this case is similar to that of the embodiment.

$$\Delta tf = \Delta tfset + (\Delta tfb - \Delta tfset) \times k \qquad (4)$$

Figure 11:
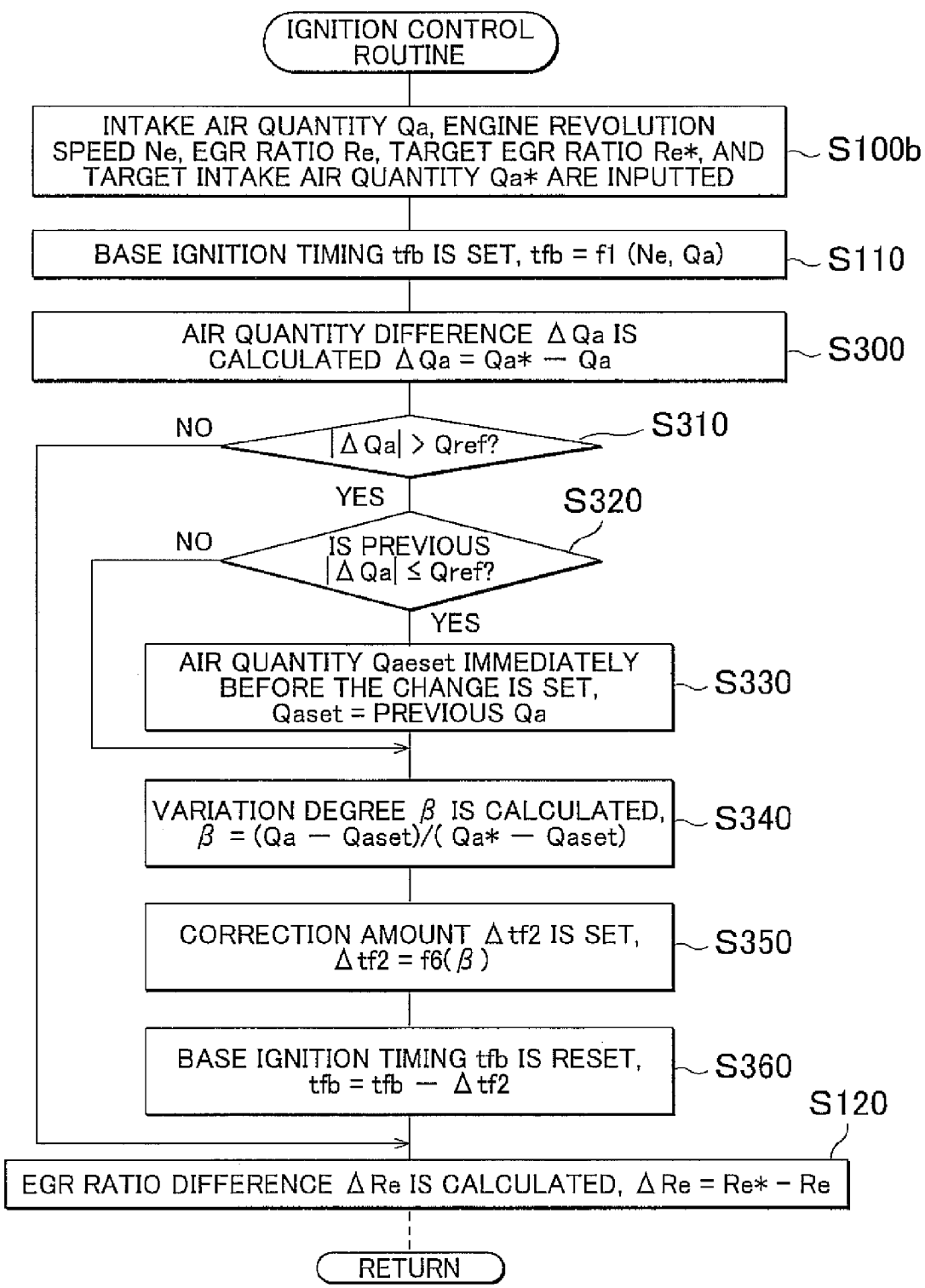
FIG. 11 is a flowchart illustrating an example of an ignition control routine of the second variation example of the present embodiment.

In the hybrid automobile 20 of the present embodiment, the ignition control taking into account the variation in the EGR ratio Re is explained, but the ignition control may be also conducted by taking into account the variation in the intake air quantity Qa in addition to the EGR ratio Re. Such a case will be explained below as a second variation example of the present embodiment. Part of an example of the ignition control routine of the second variation example is shown in FIG. 11. This routine is identical to the ignition control routine shown in FIG. 3, except that the processing of step S100b is executed instead of the processing of step S100 and that the processing of steps S300 to S360 is added between the processing of step S110 and the processing of step S120. Therefore, like processing steps are assigned with like numbers and the detailed explanation thereof is omitted. In the ignition control routine shown in FIG. 11, similarly to the processing of step S100 of the ignition control routine shown in FIG. 3, the intake air quantity Qa, revolution speed Ne of the engine 22, EGR ratio Re, and target EGR ratio Re* are inputted, the target intake air quantity Qa* is also inputted (step S100b), and the base ignition timing tfb is set by using the map for setting the base ignition timing that is shown in FIG. 4 on the basis of the inputted revolution speed Ne of the engine 22 and the intake air quantity Qa (step S110). In this case, the target intake air quantity Qa* is inputted by reading the settings on the basis of the target revolution speed Ne* of the engine 22 and the target torque Te*. The engine ECU 24 drive controls the throttle motor 136 so that the intake air quantity Qa becomes the target intake air quantity Qa* by the air intake quantity control routine in parallel with the ignition control routine and adjusts the throttle opening degree Ta, thereby conducting the intake air quantity control.

Then, the air quantity difference ΔQa is calculated by subtracting the intake air quantity Qa from the target intake air quantity Qa* (step S300) and the absolute value of the calculated air quantity difference ΔQa is compared with a threshold Qref (step S310). In this case, the threshold Qref is used to determine whether it is an air quantity variation time in which the intake air quantity Qa varies and set with consideration for detection accuracy of the intake air quantity Qa with the air flow meter 148.

When the air quantity difference ΔQa is equal to or less than the threshold Qref, it is determined the air quantity does not vary and the processing of step S120 and subsequent steps is executed similarly to the intake control routine shown in FIG. 3. Where the air quantity difference ΔQa is greater than the threshold Qref, the absolute value of the air quantity difference ΔQa (previous ΔQa) obtained when the routine was executed in the previous cycle is compared with the threshold Qref (step S320). This processing is conducted to determine whether the intake air quantity Qa started changing following variations in the target intake air quantity Qa* from a state in which the intake air quantity Qa is almost constant in the vicinity of the target intake air quantity Qa*. When the absolute value of the previous intake air quantity Qa (previous Qa) is equal to or less than the threshold Qref, it is determined that the intake air quantity Qa starts changing, and the previous intake air quantity (previous Qa) is set to an air quantity Qaset immediately before the change, which is the intake air quantity Qa immediately before the intake air quantity Qa starts changing (step S330). Further, because it is assumed that the intake air quantity Qa starts changing from a state in which the intake air quantity Qa is almost constant in the vicinity of the target intake air quantity Qa*, the intake air quantity Qaset immediately before the change also corresponds to the target intake air quantity Qa* immediately before the intake air quantity Qa starts changing. When this routine is executed in the next and subsequent cycles, because the previous air quantity difference (previous ΔQa) is larger than the threshold Qref, the setting of the air quantity Qaset immediately before the change is not conducted.

Then, a variation degree β is calculated that indicates the degree to which the intake air quantity Qa has changed from the air quantity Qaset immediately before the change toward the target intake air quantity Qa* (step S340). The calculation is performed by the following Equation (5) on the basis of the intake air quantity Qa, target intake air quantity Qa*, and air quantity Qaset immediately before the change. Further the variation degree β assumes a value of 0 when the intake air quantity Qa is equal to the air quantity Qaset immediately before the change, approaches a value of 1 from the value of 0 as the intake air quantity Qa changes, and assumes a value of 1 when the intake air quantity Qa become equal to the target intake air quantity Qa*.

$$\beta=(Qa-Qaset)/(Qa^*-Qaset) \quad (5)$$

Figure 12:
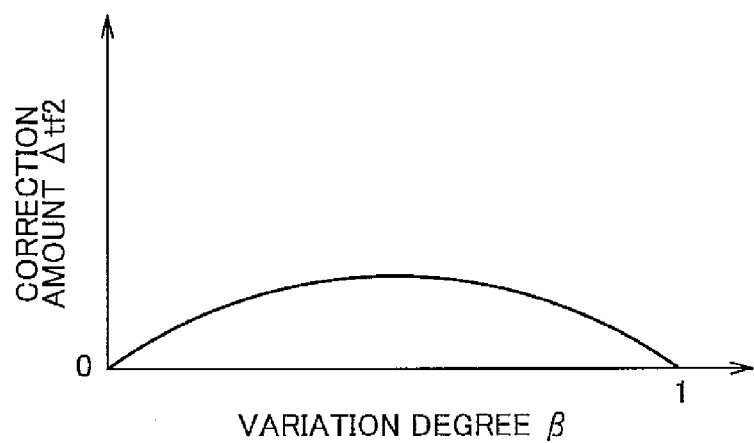
FIG. 12 is an explanatory drawing illustrating an example of a map for setting a correction coefficient of the second variation example of the present embodiment.

A correction amount Δtf2 for delaying the ignition timing of the engine 22 is then set based on the variation degree β (step S350), a value obtained by subtracting the correction amount Δtf2 that has been set from the base ignition timing tfb that was set in S110 is reset as the base ignition timing tfb (step S360), and the processing of step S120 and subsequent steps is executed. As for the correction amount Δtf2, in the present embodiment, the relationship between the variation degree β and correction amount Δtf2 is established in advance and stored as a map for setting the correction amount, and where the variation degree β is given, the corresponding correction amount Δtf2 is derived and set from the stored map. An example of the map for setting the correction amount is shown in FIG. 12. As shown in the figure, the correction amount Δtf2 increases from a value of 0 and then decreases toward a value of 0 as the variation degree β changes from a value of 0 to a value of 1. Where the correction amount Δtf2 is thus set, at the air quantity variation time when the intake air quantity Qa varies, the ignition timing that is delayed with respect to the base ignition timing tfb that has been set in step S110 is reset as the base ignition timing. Therefore, an ignition timing that is delayed with respect to that obtained without resetting the base ignition timing tfb is set as the target ignition timing tf*. Thus, when the target ignition timing tf* is set by using the reset base ignition timing tfb and the ignition timing is delayed following the increase in the intake air quantity Qa (see FIG. 4), the ignition timing is delayed faster than in the case in which the resetting of the base ignition timing tfb is not conducted, and when the ignition timing is advanced following the decrease in the intake air quantity Qa, the ignition timing is advanced slower than in the case in which the resetting of the base ignition timing tfb is not conducted. At the air quantity variation time, the detection accuracy of the intake air quantity Qa easily decreases and the base ignition timing tfb is difficult to set correctly because the throttle opening degree Ta varies, but where the ignition control is performed by setting the target ignition timing tf* by using the base ignition timing tfb that has thus been reset, the occurrence of knocking in the engine 22 can be inhibited.

In the hybrid automobile 20 of the second variation example, the base ignition timing tfb is set on the basis of the revolution speed Ne of the engine 22 and the intake air quantity Qa and at the air quantity variation time in which the intake air quantity Qa varies, the correction amount Δtf2 that has been set by taking into account the variation degree β is subtracted from the base ignition timing tftmp (timing delayed by the correction amount Δtf2 with respect to the base ignition timing tftmp), the resultant value is reset as the base ignition timing tftmp and used to set the target ignition timing tf* and the engine 22 is operated with the ignition at the target ignition timing tf* that has thus been set. Therefore, when the intake air quantity Qa varies, the occurrence of knocking in the engine 22 can be inhibited.

In the second variation example, at the air quantity variation time in which the intake air quantity Qa varies, the correction amount Δtf2 is set by using the map for setting a correction amount that is shown in FIG. 12, regardless of whether the intake air quantity Qa increases or decreases, but it is also possible to set the correction amount Δtf2 that differs with respect to the same variation degree β when the intake air quantity Qa increases and when it decreases.

Figure 13:
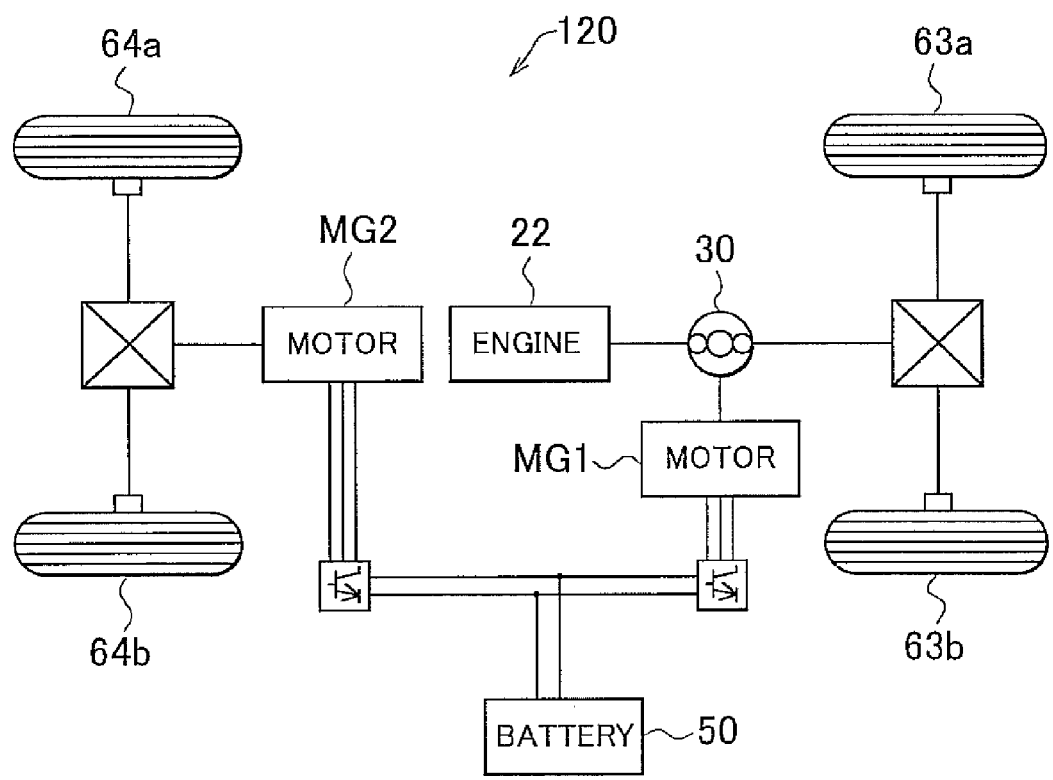
FIG. 13 is a configuration diagram illustrating schematically the configuration of the hybrid automobile of the third variation example of the present embodiment.

In the hybrid automobile 20 of the present embodiment, the power of the motor MG2 is changed by the reduction gear 35 and outputted to the ring gear shaft 32a, but the power of the motor MG2 may be also outputted to a wheel shaft (wheel shaft corrected to the wheels 64a and 64b in FIG. 13) that is different from the wheel shaft (wheel shaft connected to the driven wheels 63a and 63b) connected to the ring gear shaft 32a, as for example in a hybrid automobile 120 representing a third variation example of the present embodiment and shown in FIG. 13.

Further, the application to such hybrid automobiles is not limiting, and the invention may be also applied to internal combustion engine apparatuses to be installed on movable bodies such as vehicles other than automobiles and also ships, aircrafts, and the like and internal combustion engine apparatuses to be incorporated into stationary equipment such as construction equipment. Furthermore, the invention may be also realized as a method for controlling the internal combustion engine apparatus.

The correspondence relationship between the main features of the present embodiment and the main features of the invention will be explained below. The engine 22 of the embodiment corresponds to an example of "internal combustion engine" of the invention. The engine ECU 24 that executes the ignition control according to the ignition control routine shown in FIG. 3 in which the base ignition timing tfb is set on the basis of the revolution speed Ne of the engine 22 and the intake air quantity Qa, outside the EGR ratio variation time in which the EGR ratio Re varies, the target ignition timing tf* is set by correcting the base ignition timing tfb by the correction amount Δtf obtained from the target EGR ratio Re*, and the ignition control is conducted using the target ignition timing tf* that has thus been set, and at the EGR ratio variation time, the target ignition timing tf* is set by correcting the base ignition timing tfb by the correction amount Δtf that delays the ignition timing more than the correction amount (correction amount Δtfex of the comparative example) obtained by correcting the base correction amount Δtfb obtained from the target EGR ratio Re* by the variation degree α and the ignition control is conducted using the target ignition timing tf* that has thus been set, and also the intake air quantity control, and fuel ignition control corresponds to an example of "controller" of the invention. The motor MG1 of the present embodiment corresponds to an example of "generator" of the invention. The power distribution and integration mechanism 30 corresponds to an example of "three-shaft power input/output device", the motor MG2 corresponds to an example of "electric motor", and the battery 50 corresponds to an example of "power accumulation device".

The engine 22 of the first variation example of the embodiment corresponds to an example of "internal combustion engine". The engine ECU 24 that executes the ignition control according to the ignition control routine shown in FIG. 10 in which the base ignition timing tfb is set on the basis of the revolution speed Ne of the engine 22 and the intake air quantity Qa, outside the EGR ratio variation time in which the EGR ratio Re varies, the target ignition timing tf* is set by correcting the base ignition timing tfb by the correction amount Δtf obtained from the EGR ratio Re, and the ignition control is conducted using the target ignition timing tf* that has thus been set, and at the EGR ratio variation time, the target ignition timing tf* is set by correcting the base ignition timing tfb by the correction amount Δtf that delays the ignition timing more than the base correction amount Δtfb obtained from the EGR ratio Re, and also the intake air quantity control and fuel ignition control corresponds to an example of "controller" of the invention. The motor MG1 corresponds to an example of "generator" of the invention. The power distribution and integration mechanism 30 corresponds to an example of "three-shaft power input/output device" of the invention, the motor MG2 corresponds to an example of "electric motor" of the invention, and the battery 50 corresponds to an example of "power accumulation device".

Here, the "internal combustion engine" is not limited to an internal combustion engine that outputs power by using a hydrocarbon fuel such as gasoline or light oil and may be an internal combustion engine of any type such as a hydrogen engine. The "controller" is not limited to a device that sets the base ignition timing tfb on the basis of the revolution speed Ne of the engine 22 and the intake air quantity Qa, outside the EGR ratio variation time in which the EGR ratio Re varies, sets the target ignition timing tf* by correcting the base ignition timing tfb by the correction amount Δtf obtained from the target EGR ratio Re*, and at the EGR ratio variation time, sets the target ignition timing tf* by correcting the base ignition timing tfb by the correction amount Δtf that delays the ignition timing more than the correction amount (correction amount Δtfex of the comparative example) obtained by correcting the base correction amount Δtfb obtained from the target EGR ratio Re* by the variation degree α, and controls the engine 22 so that the engine 22 is operated with the ignition at the target ignition timing tf* that has thus been set, and may be any device configured to set a target ignition timing by correcting a base ignition timing that has been established as a base value of an ignition timing of the internal combustion engine by a first correction amount obtained from a target recirculation ratio as a target value of a recirculation ratio outside a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine, to set the target ignition timing by correcting the base ignition timing by a second correction amount that delays an ignition timing more than a provisional correction amount obtained by correcting the first correction amount by a variation degree at which the recirculation ratio varies toward the target recirculation ratio at the recirculation ratio variation time, and to control the internal combustion engine so that the internal combustion engine is operated with the ignition at the target ignition timing that has been set.

Further, the "controller" is not limited to a device that sets the base ignition timing tfb on the basis of the revolution speed Ne of the engine 22 and the intake air quantity Qa, outside the EGR ratio variation time in which the EGR ratio Re varies, sets the target ignition timing tf* by correcting the base ignition timing tfb by the correction amount Δtf obtained from the EGR ratio Re, and at the EGR ratio variation time, sets the target ignition timing tf* by correcting the base ignition timing tfb by the correction amount Δtf that delays the ignition timing more than the base correction amount Δtfb obtained from the EGR ratio Re, and controls the engine 22 so that the engine 22 is operated with the ignition at the target ignition timing tf* that has thus been set, and may be any device configured to set a target ignition timing by correcting a base ignition timing that has been established as a base value of an ignition timing of the internal combustion engine by a third correction amount obtained from a recirculation ratio outside a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine, to set the target ignition timing by correcting the base ignition timing by a fourth correction amount that delays the ignition timing more than the third correction amount at the recirculation ratio variation time, and to control the internal combustion engine so that the internal combustion engine is operated with the ignition at the target ignition timing that has been set.

The "generator" is not limited to the motor MG1 configured as a synchronous motor generator and may be a generator of any type, provided that power can be inputted and outputted, such as an inductive electric motor. The "three-shaft power input/output device" is not limited to the power distribution and integration mechanism 30 and may be any mechanism that is connected to three shafts: drive shaft, output shaft of the internal combustion engine, and rotation shaft of the generator and inputs power to one shaft and outputs power therefrom on the basis of power inputted to the other two shafts and outputted therefrom. The "generator" is not limited to the motor MG2 configured as a synchronous motor generator and may be a generator of any type, provided that power can be inputted and outputted, such as an inductive electric motor. The "power accumulation device" is not limited to the battery 50 serving as a secondary battery and may be any device that can exchange power with the generator or electric motor, such as a capacitor.

In the correspondence relationship between the main features of the embodiment and the main features of the invention, the embodiment is an example for resolving the problems and therefore places no limitation on the features of the invention. Thus, the embodiment is merely a specific example of the invention serving to resolve the problems.

The invention is explained above by using an embodiment as a mode of carrying out the invention, and the invention is not limited in any way to the embodiment and it goes without saying that the invention can be carried out in a variety of modes without departing from the scope of the invention.

The invention can be used in the field of manufacturing an internal combustion engine apparatus and a hybrid vehicle.

What is claimed is:

1. An internal combustion engine apparatus provided with an internal combustion engine in which an ignition timing can be adjusted and which has attached thereto an exhaust gas recirculation device that recirculates exhaust gas to an intake side, comprising:
   a controller that is configured to set a target ignition timing by correcting a base ignition timing that has been established as a base value of an ignition timing of the internal combustion engine by a first correction amount obtained from a target recirculation ratio as a target value of a recirculation ratio when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine,
   the controller being configured to set the target ignition timing by correcting the base ignition timing by a second correction amount that delays an ignition timing more than a provisional correction amount obtained by correcting the first correction amount by a variation degree at which the recirculation ratio varies toward the target recirculation ratio when it is the recirculation ratio variation time, and the controller is configured to take, at the recirculation ratio variation time, a ratio of a variation amount of the recirculation ratio to a variation amount of the target recirculation ratio as the variation degree and set the provisional correction amount by a sum of a value obtained by multiplying a difference in the first correction amount before and after a variation in the target recirculation ratio by the variation degree and the first correction amount before the variation of the target recirculation ratio, and
   wherein the controller being configured to control the internal combustion engine so that the internal combustion engine is operated due to the ignition at the target ignition timing that has been set.

2. The internal combustion engine apparatus according to claim 1, wherein
   the controller is configured to set the target ignition timing by correcting the base ignition timing by the second correction amount that advances the ignition timing slower than the provisional correction amount when the ignition timing is advanced following an increase in the recirculation ratio.

3. The internal combustion engine apparatus according to claim 1, wherein
   the controller is configured to set the target ignition timing by correcting the base ignition timing by the second correction amount that delays the ignition timing faster than the provisional correction amount when the ignition timing is delayed following a decrease in the recirculation ratio.

4. The internal combustion engine apparatus according to claim 1, wherein
   the controller is configured to reset the base ignition timing so that an ignition timing is delayed in comparison with the base ignition timing obtained from a revolution speed and the intake air quantity of the internal combustion engine at an air quantity variation time when the intake air quantity varies.

5. The internal combustion engine apparatus according to claim 4, wherein
   the controller is configured to reset the base ignition timing so that an ignition timing is advanced slower than the base ignition timing obtained from a revolution speed and the intake air quantity of the internal combustion engine when an ignition timing is advanced following a decrease in the intake air quantity.

6. The internal combustion engine apparatus according to claim 4, wherein
   the controller is configured to reset the base ignition timing so that an ignition timing is delayed faster than the base ignition timing obtained from a revolution speed and the intake air quantity of the internal combustion engine when an ignition timing is delayed following an increase in the intake air quantity.

7. A hybrid vehicle, comprising:
   the internal combustion engine apparatus according to claim 1:
   a generator that can input and output power;
   a three-shaft power input-output device that is connected to a drive shaft coupled to a drive wheel, an output shaft of the internal combustion engine, and a rotation shaft of the generator, and inputs or outputs power to or from any one shaft on the basis of power inputted or outputted to the remaining two shafts from among these three shafts;
   an electric motor that can be input or output power to or from the drive shaft; and
   a power accumulation device that can exchange power with the generator and the electric motor.

8. A control method for an internal combustion engine apparatus provided with an internal combustion engine in which an ignition timing can be adjusted and which has attached thereto an exhaust gas recirculation device that recirculates exhaust gas to an intake side, the method comprising:
   setting a target ignition timing by correcting a base ignition timing that has been established as a base value of an ignition timing of the internal combustion engine by a first correction amount obtained from a target recirculation ratio as a target value of a recirculation ratio when it is not a recirculation ratio variation time in which the recirculation ratio varies, the recirculation ratio being a ratio of a recirculation amount to a sum of the recirculation amount of the exhaust gas to the intake performed by the exhaust recirculation device and an intake air quantity of the internal combustion engine;
   setting the target ignition timing by correcting the base ignition timing by a second correction amount that delays an ignition timing more than a provisional correction amount obtained by correcting the first correction amount by a variation degree at which the recirculation ratio varies toward the target recirculation ratio when it is the recirculation ratio variation time;
   setting, at the recirculation ratio variation time, the variation degree as a ratio of a variation amount of the recirculation ratio to a variation amount of the target recirculation ratio and setting the provisional correction amount by a sum of a value obtained by multiplying a difference in the first correction amount before and after a variation in the target recirculation ratio by the variation degree and the first correction amount before the variation of the target recirculation ratio; and controlling the internal combustion engine so that the internal combustion engine is operated due to the ignition at the target ignition timing that has been set.

\* \* \* \* \*